US006979502B1

(12) United States Patent
Gartstein et al.

(10) Patent No.: US 6,979,502 B1
(45) Date of Patent: Dec. 27, 2005

(54) BATTERY HAVING A HOUSING FOR ELECTRONIC CIRCUITRY

(75) Inventors: Vladimir Gartstein, Cincinnati, OH (US); Dragan D. Nebrigic, Indian Springs, OH (US); Eric R. Bartsch, Cincinnati, OH (US); Robert J. Peterson, Loveland, OH (US); Chow-Chi Huang, West Chester, OH (US); Edward L. Schmidt, Liberty Township, OH (US)

(73) Assignee: Board of Trustees of the University of Illinois, Chicago, IL (US)

( * ) Notice: Subject to any disclaimer, the term of this patent is extended or adjusted under 35 U.S.C. 154(b) by 117 days.

(21) Appl. No.: 10/009,104

(22) PCT Filed: Jun. 20, 2000

(86) PCT No.: PCT/US00/17007

§ 371 (c)(1),
(2), (4) Date: Mar. 20, 2002

(87) PCT Pub. No.: WO00/79635

PCT Pub. Date: Dec. 28, 2000

Related U.S. Application Data

(60) Provisional application No. 60/140,092, filed on Jun. 21, 1999.

(51) Int. Cl.$^7$ ............................................. H01M 14/00
(52) U.S. Cl. ............................ 429/7; 429/92; 429/176; 429/178
(58) Field of Search ................................ 429/7, 92, 93, 429/178, 176, 96, 121, 90, 91; 320/134, 135, 320/161, 112; 340/636.15; 324/429

(56) References Cited

U.S. PATENT DOCUMENTS

| 4,861,685 A | | 8/1989 | Tien et al. |
| 5,656,876 A | | 8/1997 | Radley et al. |
| 5,705,292 A | * | 1/1998 | Yukita et al. ............... 429/137 |
| 5,912,092 A | * | 6/1999 | Maruyama et al. ........... 429/96 |

FOREIGN PATENT DOCUMENTS

| EP | 0644642 | 3/1995 |
| EP | 0653798 | 5/1995 |
| EP | 0849815 | 6/1998 |
| JP | 07201358 | 4/1995 |
| JP | 09139235 | 5/1997 |
| JP | 09266015 | 10/1997 |
| JP | 10040885 | 2/1998 |
| JP | 11026029 | 1/1999 |

* cited by examiner

*Primary Examiner*—Raymond Alejandro
(74) *Attorney, Agent, or Firm*—Greer, Burns & Crain, Ltd.

(57) ABSTRACT

A battery is disclosed that includes a container having a positive terminal and a negative terminal and an electrochemical cell disposed within said container, said cell having a positive electrode, a negative electrode, and a cell voltage measured across said positive and said negative electrodes of said cell. The battery further includes a housing containing electronic circuitry associated with said container, said electronic circuitry electrically connected between said electrodes of said cell and said terminals of said container to create an output voltage measured across said positive and said negative terminals of said container and wherein the container and housing substantially enclose the electrochemical cell.

9 Claims, 5 Drawing Sheets

//www.w3.org/1999/xhtml">
BATTERY HAVING A HOUSING FOR ELECTRONIC CIRCUITRY

This application is a national phase application depending from Patent Cooperation Treaty Patent Application Number PCT/US00/17007 filed on Jun. 20, 2000 (now abandoned), which claims the benefit of U.S. Provisional Patent Application No. 60/140,092 filed on Jun. 21, 1999 (now abandoned).

FIELD OF THE INVENTION

The present invention relates to batteries and more particularly to batteries having a housing for electronic circuitry, such as a built-in controller or an indicator for battery life.

BACKGROUND OF THE INVENTION

Consumers use batteries in portable electronic devices such as radios, compact disc players, cameras, cellular phones, electronic games, toys, pagers, and computer devices, etc. As electronic devices become faster and more complex, the devices have required more current than before. Consequently, the demands on batteries to provide greater utilization of stored energy are even greater. Co-pending applications referred to above disclose devices including a built-in controller capable of providing functions such as greater utilization of stored energy to extend the service run time of the battery, control of an electrochemical cell charge cycle by directly monitoring the electrochemical properties of that particular cell, providing a safety disconnect in the event of overheating, inverse polarity, short-circuit, over-pressure, over-charge, over-discharge or excessive hydrogen generation, and an indicator of remaining battery life to inform consumers of available stored energy. Developments such as these as well as others require electronic circuitry to be embedded inside a battery or somehow affixed to a battery.

However, there are many problems associated with having electronic circuitry embedded inside the battery. For example, if the electronic circuitry or electronic connections embedded in the battery are in contact with or are within the same container as the electrochemical components of the cell, these components may come into contact with the electronic circuitry or create a corrosive atmosphere that may cause damage to the electronic circuitry or electronic connections. Another problem is the electronic circuitry or electronic connections may cause electromagnetic interference (EMI) which may adversely affect the electronic devices within which the batteries are located. The electronic devices may also cause EMI which may adversely affect the electronic circuitry within the battery. Another problem associated with having electronic circuitry embedded inside the battery is that the electronic circuitry is not as sturdy as the battery cell and is easily damaged if dropped or handled roughly by a consumer. Another problem is that it is difficult to ensure reliable electronic connections from the electronic circuitry to the positive and the negative electrodes of the electrochemical cell or the positive and negative terminals of the battery, which may be required for the electronic circuitry to function. Additionally, when the electronic circuitry is embedded inside the battery container, if the electronic circuitry fails, the entire battery may also fail. This may result in unnecessary waste of an otherwise operable electrochemical cell.

SUMMARY OF THE INVENTION

The present invention provides a battery having a housing for electronic circuitry. The battery includes a container having a positive terminal and a negative terminal, an electrochemical cell and a housing containing electronic circuitry that is associated with the container. The electronic circuitry is electrically connected to the electrodes of the electrochemical cell and the terminals of the battery to create an output voltage measured across the terminals of the container.

BRIEF DESCRIPTION OF THE DRAWINGS

While the specification concludes with claims particularly pointing out and distinctly claiming the present invention, it is believed that the present invention will be better understood from the following description in conjunction with the accompanying drawings in which like reference numerals identify identical elements and wherein:

DETAILED DESCRIPTION OF THE INVENTION

The present invention provides a housing for electronic circuitry that is affixed to a consumer battery. The term "battery," as used in this application, refers to a container having terminals and a single electrochemical cell, or a structure that has terminals and at least substantially contains two or more electrochemical cells (e.g., a standard 9 volt battery or a battery for a cellular telephone or laptop computer). The electrochemical cells need not be completely enclosed by a single structure if each cell has its own individual container. A portable telephone battery, for example, may contain two or more electrochemical cells that each have their own individual containers and are packaged together in a shrink-wrap plastic material that holds the individual containers together but may not completely enclose the individual containers of the cells. The term "consumer" in this application refers to a battery that is intended to be used in an electronic or electric device purchased or used by a consumer. The batteries of the present invention can be either primary or rechargeable. The term "primary" is used in this application and refers to a battery or an electrochemical cell that is intended to be discarded after its usable electrical storage capacity has been depleted (i.e., it is not intended to be recharged or otherwise reused). The terms "rechargeable" and "secondary" are used interchangeably in this application and refer to a battery or an electrochemical cell that is intended to be recharged at least once after its usable electrical storage capacity has been depleted (i.e., it is intended to be reused at least once).

Housing for Electronic Circuitry

Figure 1:
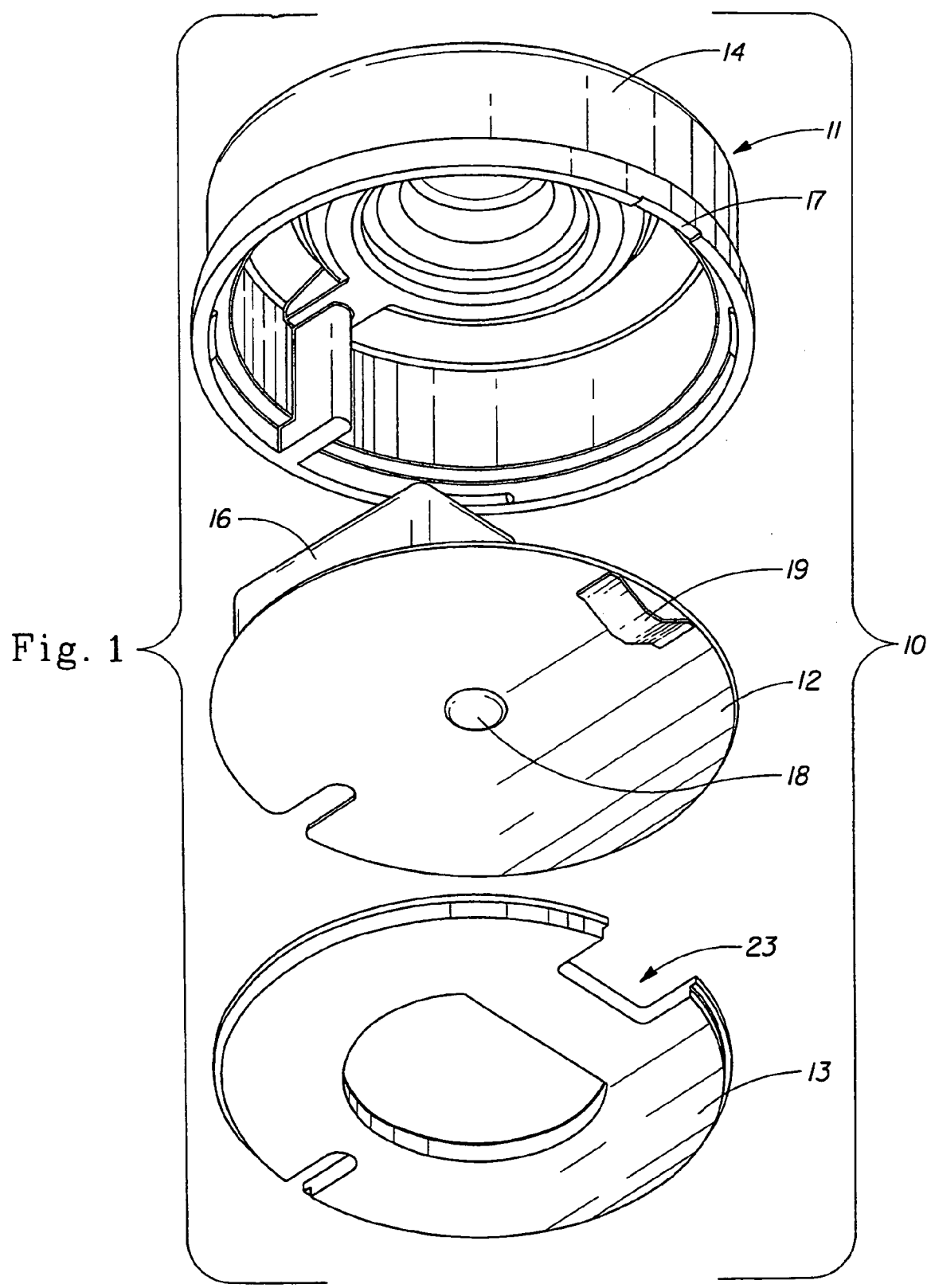
FIG. 1 is an exploded bottom perspective view of the main components of a housing according to the present invention.
Figure 2:
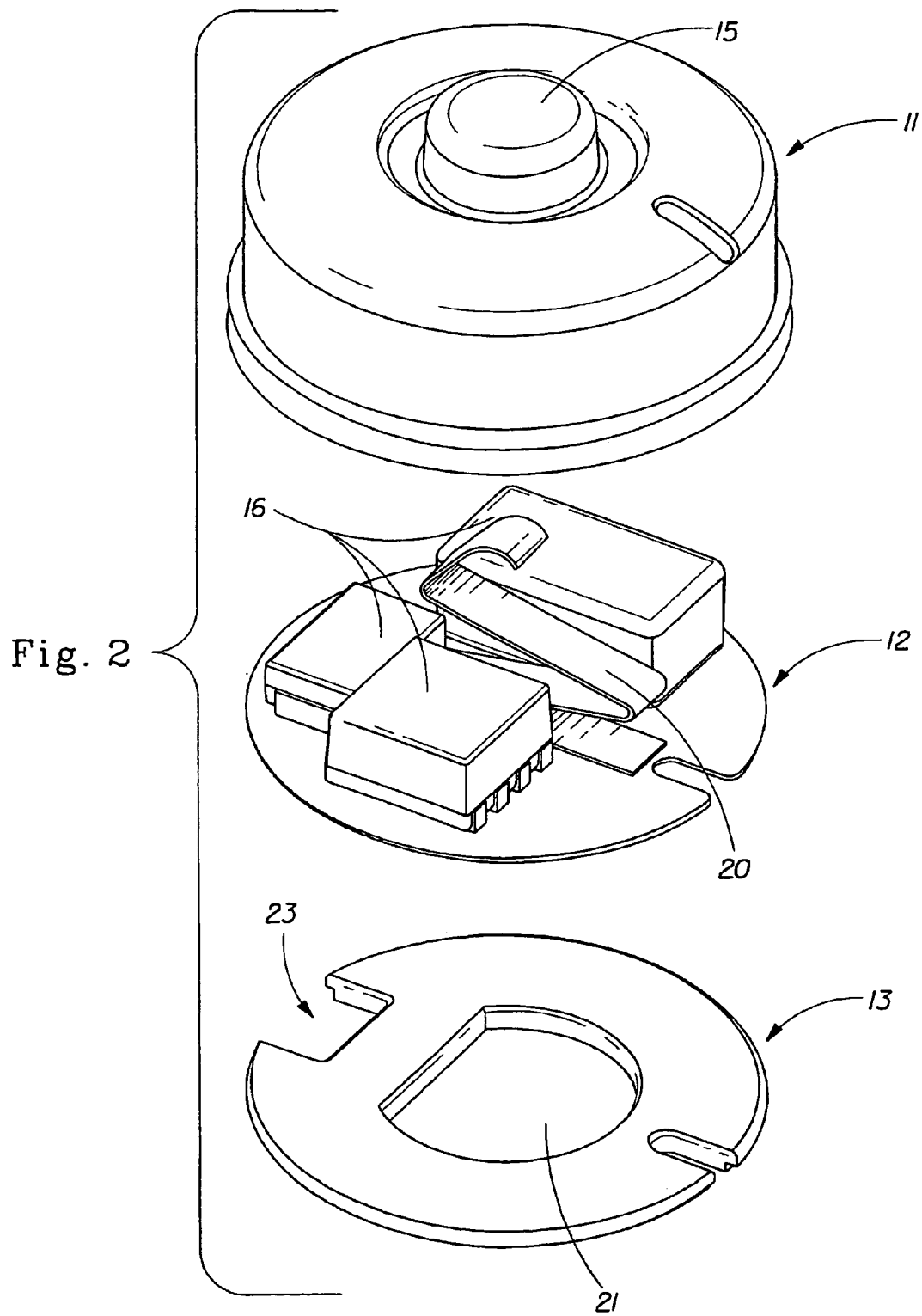
FIG. 2 is an exploded top perspective view of the main components of a housing according to the present invention.

FIG. 1 shows a bottom exploded perspective view of a particularly preferred embodiment of unassembled elements of a housing for a single-cell battery according to the instant invention. FIG. 2 shows a top exploded perspective view of a particularly preferred embodiment of the unassembled elements of a housing for a single-cell battery according to the instant invention. As used in this application, a "housing" refers to an assembly that houses electronic circuitry. In one aspect of the present invention, the electronic circuitry except for the input and output leads may be sealed inside the housing to protect the electronic circuitry components from the potentially corrosive or damaging electrochemical components of the cell. In another aspect of the present invention, the housing may be designed such that the housing for the electronic circuitry may be separately assembled and tested. Such a housing may then be assembled together with the battery container.

In a preferred embodiment of the instant invention, the housing 10 has three main elements: the bezel 11, the circuit board 12, and the retaining ring 13, as shown in FIGS. 1 and 2.

The bezel 11 contains a body portion 14 and an output terminal 15. The output terminal 15 could be the output terminal of the battery or can be electrically connected to an output terminal of the battery. The body portion 14 of the bezel 11 is preferably molded of an insulating material that is impact-resistant, such as plastic, thermoplastic, polymer or polycarbonate. The impact-resistant bezel 11 provides protection for electronic circuitry 16 contained within the housing from static shock during manufacturing and mechanical shock such as dropping. The output terminal 15 is made of conductive material. In one preferred embodiment, the output terminal forms the positive terminal of the battery. Preferably, the output terminal 15 is metal and located in the center of bezel 11. Preferably, the body portion 14 of the bezel 11 is insert-molded around the output terminal 15. The bezel 11 preferably conforms to the shape and standard outer dimensions of a standard battery. For example, if the housing 10 is placed on the top of an AA size battery, the bezel 11 would preferably be dome-shaped, as shown in FIG. 1. It is also preferable that at least a portion of the body portion 14 of the bezel 11 is made of translucent or transparent material so that the circuit board 12 may be easily viewed by a consumer after the housing 10 is assembled. Preferably, the bezel 11 contains a notch 17 to aid in aligning the bezel 11, circuit board 12 and retaining ring 13 during assembly of the housing 10.

The circuit board 12 comprises the electronic circuitry 16 to be utilized within the battery 10. Preferably, the circuit board 12 is made of Mylar or Kapton. The electronic circuitry 16 has at least three electrical contacts, a positive input contact 18, a negative input contact 19 and an output contact 20. Preferably, the positive input contact 18 is located in the center of the bottom of the board 12 and the negative input contact 19 is located at the bottom edge of the board 12. The negative input contact 19 may also be used to aid in aligning the bezel 11, circuit board 12 and retaining ring 13 during assembly. In a preferred embodiment, the output contact 20 of the circuit board 12 is a positive output contact that is electrically connected to the output terminal 15 of the bezel 11.

In an alternative embodiment, the housing output terminal forms the negative terminal of the battery. In this alternative embodiment, the output contact of the circuit board may be a negative output contact that is electrically connected to the negative output terminal of the battery. The circuit board may also include additional output contacts such as a second output contact. The second output contact of the circuit board may provide, for example, a negative output contact that is electrically connected to the negative terminal of the battery if the output contact is electrically connected to the positive terminal of the battery. This may allow for a virtual ground in which the negative terminal of the battery is isolated from the negative electrode of the electrochemical cell.

Another output contact may be an output contact for an indicator that is external to the housing. Such an output contact may be used to control an indicator such as the ones described in co-pending application U.S. Ser. No. 09/275,495, filed on Mar. 24, 1999, entitled BATTERY HAVING A BUILT-IN INDICATOR, now U.S. Pat. No. 6,835,491 issuing on Dec. 28, 2004, naming Vladimir Gartstein and Dragan D. Nebrigic, which is incorporated by reference above.

Preferably, if at least a portion of the bezel 11 is translucent or transparent, the circuit board 12 may include an indicator such as an LED that a user may be able to see through the bezel 11 of the housing 10. In a preferred embodiment, the LED indicator may have several different colors to indicate various amounts of remaining battery life. For example, the color green may be used to indicate full capacity, yellow to indicate partial capacity, and red to indicate no capacity. In another preferred embodiment, at least a portion of the bezel may be made of a flexible material such that the flexible portion of the bezel may form a "button" to activate an LED indicator. In yet another embodiment, the second output 20 contact may provide an output through which a device could receive information about the battery such as the remaining capacity of the electrochemical cell, or an output that may be used for quality assurance testing of an assembled housing or of an assembled battery.

The retaining ring 13 is preferably made of an insulating or dielectric material. The retaining ring 13 includes an opening 21 that allows the positive input contact 18 of the circuit board 12 to electrically connect to the positive electrode 26 of the electrochemical cell 22. The retaining ring 13 may further include a notch 23 to aid in aligning the bezel 11, circuit board 12 and retaining ring 13 during assembly.

Figure 3:
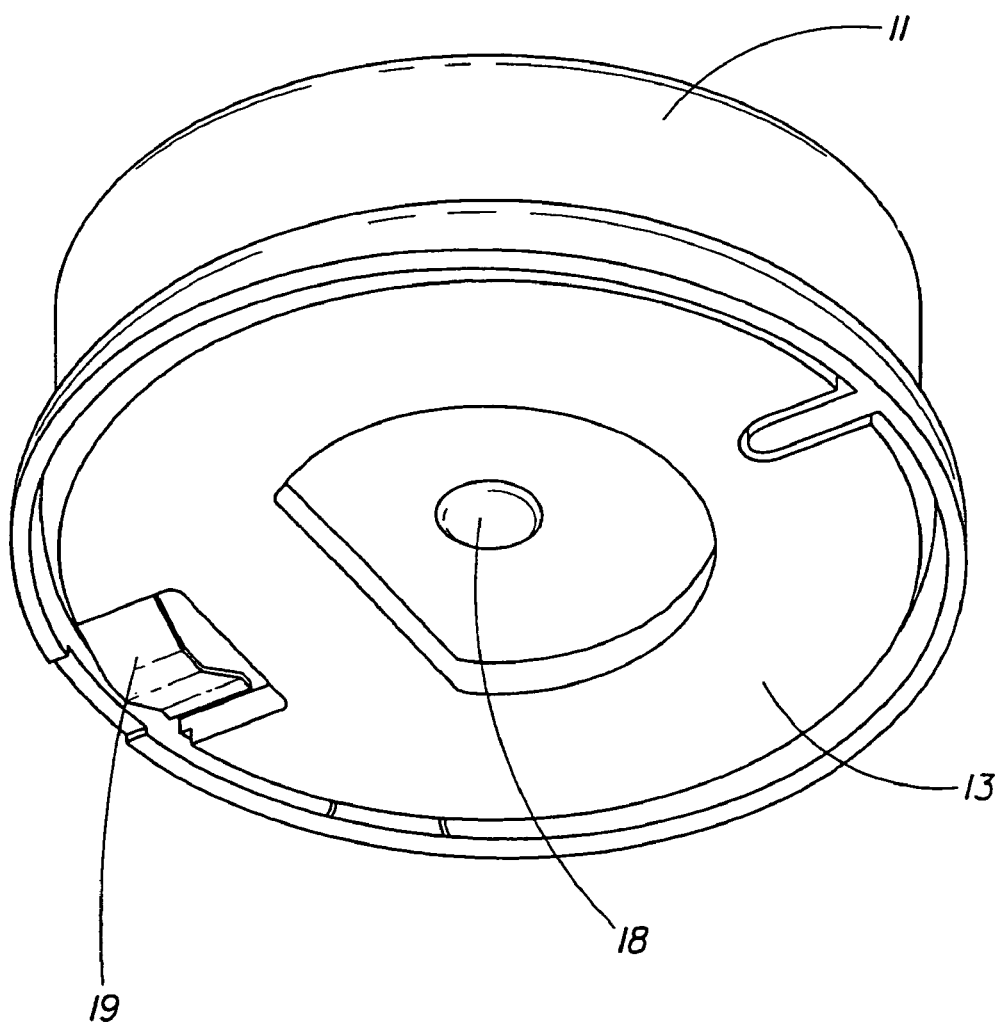
FIG. 3 is a bottom perspective view of an assembled housing of the present invention.

FIG. 3 shows a preferred embodiment of an assembled housing according to the instant invention. The bezel 11, circuit board 12, and retaining ring 13 are preferably assembled by placing the circuit board 12 inside the bezel 11. Preferably, the circuit board 12 is placed so that the electronic circuitry 16 is facing toward the bezel 11. Then, the retaining ring 13 is attached to the bottom of the bezel 11. The bezel 11, circuit board 12, and retaining ring 13 are preferably mechanically registered rotationally to align the bezel notch 17, the negative terminal contact 19, and the retaining ring notch 23. Preferably, the bezel 11, circuit board 12, retaining ring 13 are then attached together. Additionally, the housing 10 may be sealed, such as by a plug seal, a welded seal or a high impact pressure seal, to provide protection against the intrusion of moisture and/or particulates into the housing 10.

Because the housing 10 is assembled separately from the electrochemical cell 22, the housing 10 may be tested for operability independent of the electrochemical cell 22. If a housing is defective, the failed housing may be disposed of before it is combined with the electrochemical cell, thereby minimizing waste of inoperable batteries due to electronic circuitry 16 failure. Separately assembling the housing 10 also allows for cleaner assembly processes in a clean environment such as in a typical clean room used in electronic processing and assembly to prevent contamination or damage of the electronic components that might otherwise be impossible to achieve if the electronic component were assembled on a battery assembly line. Also, the assembled housing 10 may be used with various types of electrochemical cells (i.e. alkaline, zinc carbon, metal air, NiCd, lithium, lithium ion, nickel metal hydride, etc.). These technical advantages allow the instant invention to be both cost effective and easily manufacturable.

Figure 5:
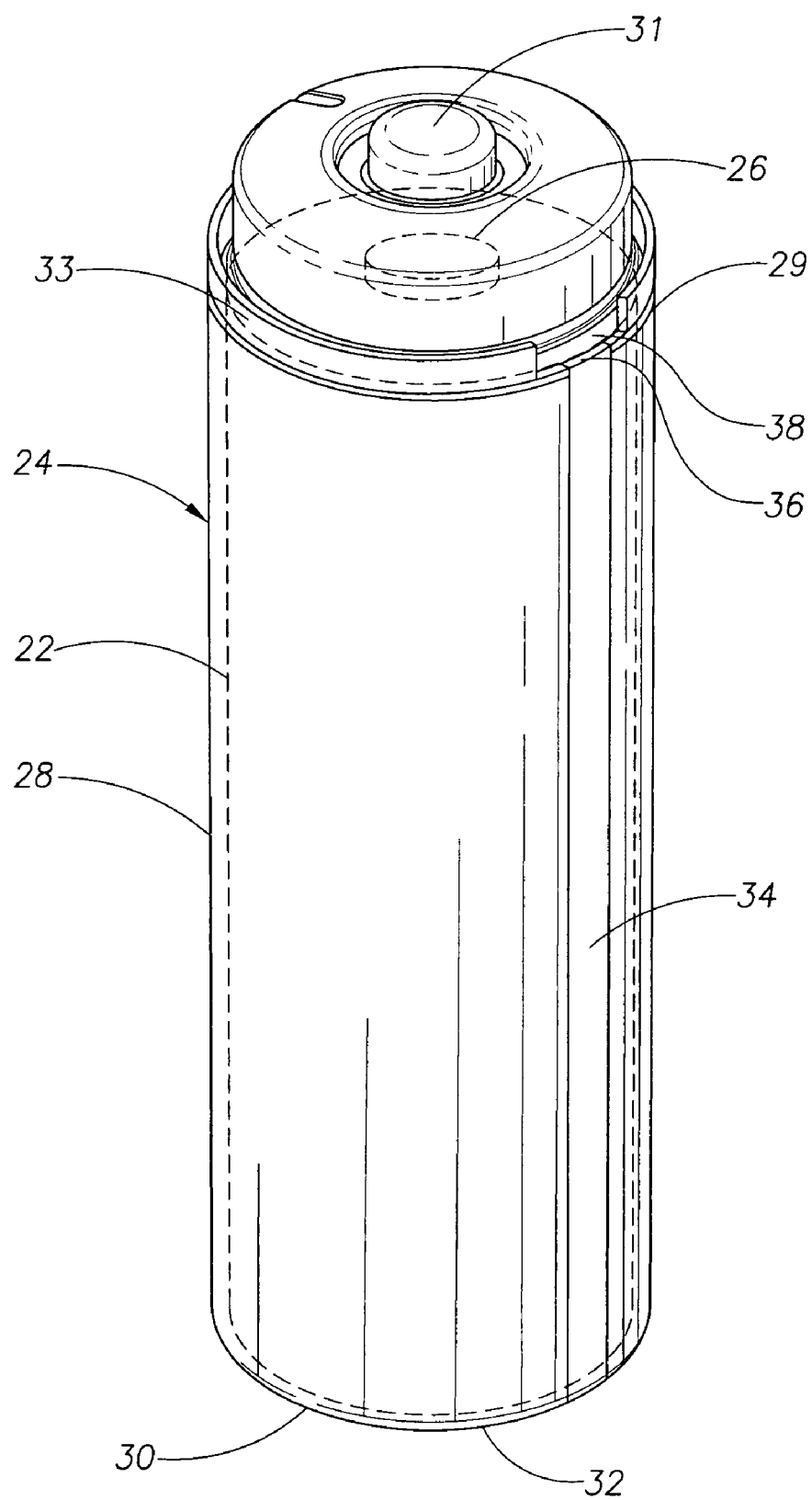
FIG. 5 is a perspective view of an assembled battery having a housing for electronic circuitry according to the present invention.

As shown in FIG. 5, the assembled housing 10 containing the electronic circuitry 16 is physically and electrically connected to an electrochemical cell 22. The assembled housing is associated with the battery container 24. However, the housing 10 is separate from the electrochemical cell 22. Preferably, the housing forms or contains a separate compartment for housing the electronic circuitry apart from the electrochemical cell 22. For example, the assembled housing may be either positioned on or positioned within the battery container 24. The assembled housing may be either affixed by any suitable attaching means to the electrochemical cell. "Attached" or "attaching means" includes, but is not limited to spot welding, crimping, adhesive, snap fitting, and interlocking, etc.

Figure 4:
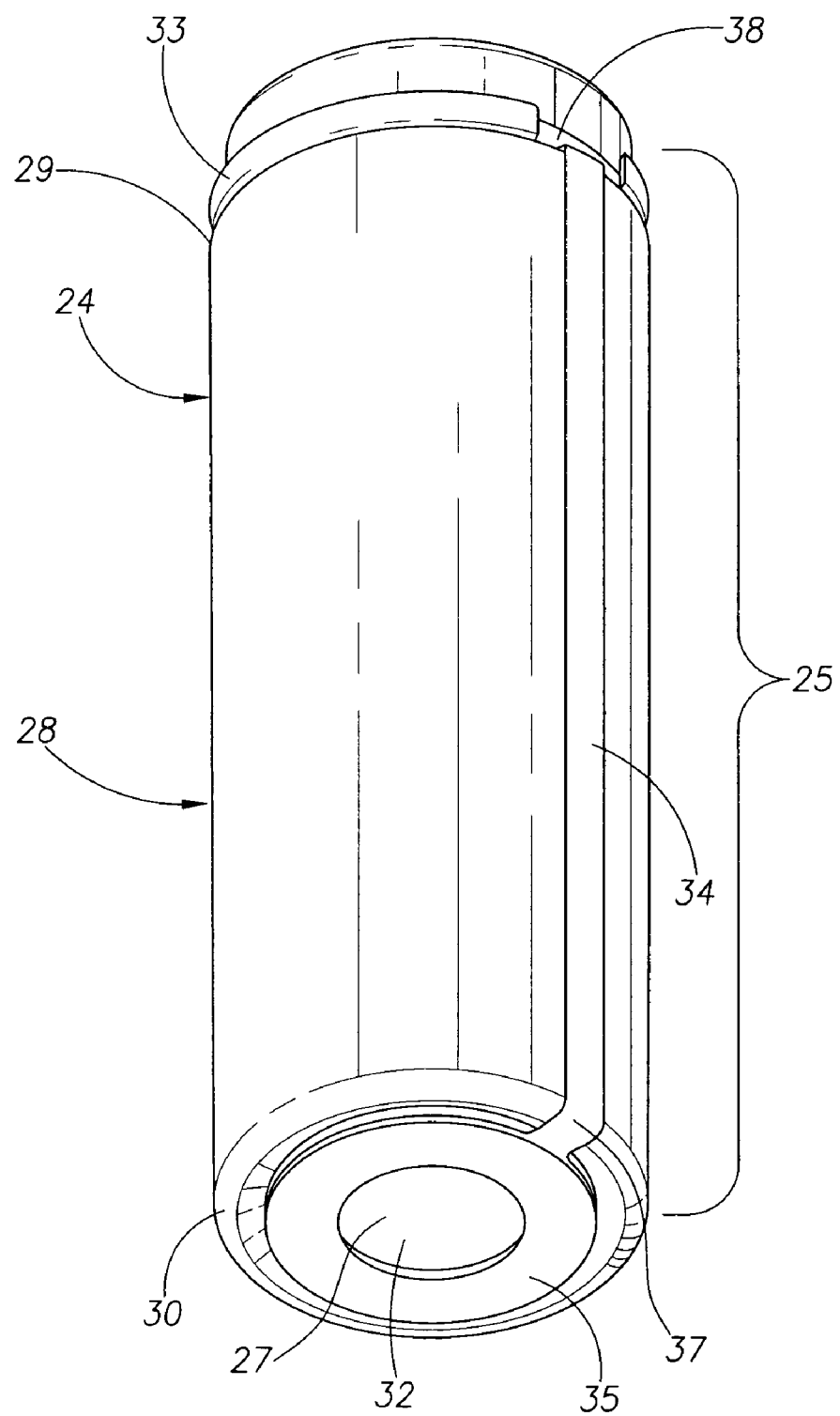
FIG. 4 is a bottom perspective view of a battery subassembly of the present invention.

As shown in FIG. 4, preferably, the assembled housing 10 is physically and electrically connected to a battery container by means of a subassembly 25. FIG. 4 shows a particularly preferred embodiment of a single-cell battery subassembly 25 of the instant invention. The battery container 24 contains a single electrochemical cell 22. The container 24 includes all the elements necessary to insulate and protect the positive 26 and the negative 27 electrodes, separator and the electrolyte of the electrochemical cell 22 from the environment and to provide electrical energy from the electrochemical cell 22 outside of the container 22. Thus, the container 24 in FIGS. 4 and 5 include a side wall 28, top 29 and bottom 30 caps, and positive 31 and negative 32 terminals that provide for electrical connection of the cell 22. The container 24 may be made of a combination of conducting material, such as metal, and insulating material, such as plastic or a polymer.

In the preferred embodiment, the physical and electrical connections are achieved by a retainer 33, a ground lead 34, and a false bottom 35.

The retainer 33 provides a socket for mounting the housing 10. The retainer 33 is attached to the electrochemical cell 22 at the desired location of the housing 10. In a preferred embodiment, the retainer 33 is at the top of the electrochemical cell 22. However, the retainer 33 may be attached to the bottom or the side of the electrochemical cell 22. Preferably, the retainer 33 is spot welded to the batter container 22. Preferably the assembled housing 10 is attached to the retainer 33 such that the retainer ring and the retainer are affixed. Preferably, the housing 10 and retainer 33 are affixed by crimping, snapping, or adhesive. Preferably, the retainer 33 has a notch 38 to allow space for the ground lead 34 to connect the electronic circuitry to the negative ground.

The positive input contact 18 of the electronic circuitry is electrically connected to the positive electrode 26 of the electrochemical cell 22. The positive output contact 20 of the electronic circuitry 16 is electrically connected to the positive terminal 31. The negative input contact 19 is electrically connected to the negative electrode 27 of the electrochemical cell 22. In a preferred embodiment, the output contact 20 is positive and is electrically connected to the positive terminal 15 of the battery. In an alternative embodiment of the instant invention, the output contact 20 is negative and is electrically connected to the negative terminal of the battery. The terms "electrically connected", "electrical connection" and "electrically coupled" refer to connections or couplings that allow for continuous flow.

The ground lead 34 is preferably a flexible strip comprising a conductive layer and an insulating layer. The ground lead 34 has a first end 36 and a second end 37. The conductive layer of ground lead 34 is oriented such that it faces away from the wall of the electrochemical cell 22. Preferably, the conductive layer is made of metal foil. Preferably, the insulating material is made of a thin polymer film. Preferably, the ground lead 34 is attached to the side 28 of the battery container 24 and is folded over the top 29 and bottom 30 of the container 24. The insulating material may have adhesive coated on it to provide a means for attaching the ground lead 34 to the battery container 24. The first end 36 of the ground lead 34 is attached to the output 20 of the circuit board 13. The ground lead 34 is folded through the retainer notch 38.

The false bottom 35 is a metal washer. The false bottom 35 attaches the second end 36 of the ground lead 34 to the bottom of the battery container to provide a ground. Further, the false bottom 35 provides a heat sink for the electronic circuitry.

Preferably, the battery having a housing containing electronic circuitry of the present invention conforms to the standard outer dimensions and a standard terminal voltage of a conventional consumer battery. Thus, preferably the electrochemical cell 22 is slightly shorter than a conventional consumer battery to provide space for the housing 10 to allow the battery having a housing for circuitry that fits in and operates in standard electronic devices. It is also preferable that the slight shortening of the electrochemical cell minimizes the reduction of the volume of active electrochemistry.

Electronic Circuitry

The housing 10 of the present invention contains one or more types of electronic circuitry 16. For example, the electronic circuitry 16 may be a controller that performs one or more of the following functions: greater utilization of stored energy to extend the service run time of the battery, control of an electrochemical cell charge cycle by directly monitoring the electrochemical properties of that particular cell, providing a safety disconnect in the event of overheating, inverse polarity, short-circuit, over-pressure, overcharge, over-discharge or excessive hydrogen generation, or an indicator of remaining battery life to inform consumers of available stored energy.

The electronic circuitry 16 of a battery of the present invention may perform one or more of the functions listed above. The electronic circuitry 16 of the present invention may contain one circuit that performs each of the desired functions, or may contain individual circuits that each perform one or more of the desired functions. In addition, the individual circuits may share circuitry such as sensing circuitry that may provide control signals to the individual circuits.

Batteries having Housing for Electronic Circuitry

The electrochemical cell(s) 22 of the instant of the instant invention may be either single-cell or multiple-cell.

The term "single-cell" refers to a battery having a single electrochemical cell packaged individually such as a standard AA, AAA, C or D type battery, or a single-cell in a multiple-cell battery (e.g., such as a standard 9 volt battery or a battery for a cellular telephone or laptop computer).

Multiple-cell batteries may include two or more of the same type of electrochemical cell, or include two or more different types of electrochemical cells in a hybrid battery.

The multiple-cell battery of the present invention may contain electrochemical cells electrically arranged in series and/or in parallel. As used in this application, the term "hybrid battery" includes a multiple-cell battery that contains two or more voltaic cells of which at least two of those cells have different voltaic mechanisms such as photovoltaic, fuel, thermal, electrochemical, electromechanical, etc. or a different electrode, a different pair of electrodes or a different electrolyte. As used in this application term, "cell" is used to refer generally to voltaic cells used in a battery, including electrochemical cells. Also, voltaic or electro voltaic cell is used interchangeably and describes various physical mechanisms of generation of electricity including chemical. In addition, a hybrid cell may contain additional energy storage elements improving cell voltage and current discharge characteristics such as a super or ultra capacitor, high efficiency inductor, or low capacity secondary cell. The hybrid cell elements can be made to replace inactive cell construction elements such as label, seal, hollow terminals, etc.

In a first preferred embodiment, the electronic circuitry 16 of a single-cell battery may be electrically connected in series and/or parallel with the electrochemical cell(s) inside a housing attached to the container of a cell. In a second preferred embodiment, the electronic circuitry 16 of a multiple-cell battery may be packaged along with one or more of the individual cells as described with respect to a single-cell battery and/or may be packaged along with a combination of multiple cells such that the electronic circuitry is connected in series or in parallel with the combination of electrochemical cells.

Although particular versions and embodiments of the present invention have been shown and described, various modifications can be made to the battery having a housing for electronic circuitry without departing form the teachings of the present invention. The terms used in describing the invention are used in their descriptive sense and not as terms of limitation, it being intended that all equivalents thereof be included within the scope of the claims.

What is claimed is:

1. A battery comprising:
   (a) a container having a positive terminal and a negative terminal;
   (b) an electrochemical cell disposed within said container, said cell having a positive electrode, a negative electrode, and a cell voltage measured across said positive and said negative electrodes of said cell; and
   (c) a housing containing electronic circuitry associated with said container, said electronic circuitry electrically connected between said electrodes of said cell and said terminals of said container to create an output voltage measured across said positive and said negative terminals of said container, said housing includes a bezel, a circuit board and a retaining ring, said bezel and said retaining ring forming a compartment, said circuit board being located within said compartment.

2. The battery of claim 1, wherein said electronic circuitry is substantially physically isolated from said electrochemical cell.

3. The battery of claim 1, wherein said compartment is sealed.

4. The battery of claim 1, wherein at least a portion of said housing is translucent, and said circuit board includes a visual indicator.

5. The battery of claim 1, wherein said bezel and said retaining ring include a notch.

6. The battery of claim 1, wherein said circuit board includes a positive input contact, a negative input contact and an output contact electrically connected to said positive terminal or said negative terminal of said container.

7. The battery of claim 1, further comprising a second output contact, said second output contact being electrically connected to one or more of the group of: an indicator external to said compartment and an external device.

8. The battery of claim 1, wherein said bezel includes a button to activate an indicator.

9. The battery of claim 1, wherein said circuit board includes a controller.

* * * * *